United States Patent
Masin et al.

(10) Patent No.: US 11,281,952 B2
(45) Date of Patent: Mar. 22, 2022

(54) SYSTEMS AND METHODS TO SECURE TRANSPONDERS WITHIN RFID TAGS WITHOUT POTTING ELEMENTS

(71) Applicant: Trovan, Ltd., Isle of Man (GB)

(72) Inventors: Joseph V. Masin, Santa Barbara, CA (US); Radek Dokoupil, Lanskroun (CZ)

(73) Assignee: Trovan, Ltd., Isle of Man (GB)

( * ) Notice: Subject to any disclaimer, the term of this patent is extended or adjusted under 35 U.S.C. 154(b) by 0 days.

(21) Appl. No.: 16/430,956

(22) Filed: Jun. 4, 2019

(65) Prior Publication Data

US 2020/0387767 A1 Dec. 10, 2020

(51) Int. Cl.
| | | |
|---|---|---|
| *G06K 19/07* | (2006.01) | |
| *G06K 19/04* | (2006.01) | |
| *G06K 7/10* | (2006.01) | |
| *G06K 19/077* | (2006.01) | |

(52) U.S. Cl.
CPC .......... *G06K 19/0723* (2013.01); *G06K 7/10* (2013.01); *G06K 19/041* (2013.01); *G06K 19/077* (2013.01)

(58) Field of Classification Search
CPC ............. G06K 19/0723; G06K 19/083; G06K 19/077; G06K 7/10445; G06K 7/10; G06K 19/18; G06K 19/041
See application file for complete search history.

(56) References Cited

U.S. PATENT DOCUMENTS

| 4,640,979 A | * | 2/1987 | Schmalzl | ............. | H05K 9/0016 |
| | | | | | 174/366 |
| 4,746,556 A | | 5/1988 | Matsuguchi et al. | | |
| 5,440,295 A | * | 8/1995 | Ciecwisz | ............ | E05B 73/0017 |
| | | | | | 340/573.4 |
| 5,461,807 A | * | 10/1995 | Johnson | ............... | A01K 11/004 |
| | | | | | 40/300 |
| 5,867,102 A | | 2/1999 | Souder et al. | | |

(Continued)

FOREIGN PATENT DOCUMENTS

| EP | 1424651 | 6/2004 |
| WO | WO2016191794 | 12/2016 |

OTHER PUBLICATIONS

International Searching Authority, "Notification of Transmittal of the International Search Report and the Written Opinion of the International Searching Authority," dated Jul. 3, 2020, in International application No. PCT/EP2020/062584.

*Primary Examiner* — Daniel I Walsh

(74) *Attorney, Agent, or Firm* — Trop, Pruner & Hu, P.C.

(57) ABSTRACT

Systems and methods are disclosed for RFID (radio frequency identifier) tags with transponders secured within housings without potting elements using one or more components located at edges of cavities for the housings. For certain embodiments, an RFID transponder is positioned within a cavity formed in a housing for an RFID tag, and regions at the edge of the cavity are deformed using heat treatment to secure the RFID transponder within the housing. For certain embodiments, click pins are used to secure the RFID transponder within the housing. Once secured, an adhesive is used to attach the resulting RFID tag to the surface of an object. Preferably, the adhesive fills at least a portion of the cavity surrounding the RFID transponder during this attachment process. Tamper resistant solutions are also disclosed.

10 Claims, 5 Drawing Sheets

(56) References Cited

U.S. PATENT DOCUMENTS

| | | | | |
|---|---|---|---|---|
| 5,891,156 A * | 4/1999 | Gessner | | A01K 11/004 606/117 |
| 6,043,746 A | 3/2000 | Sorrells | | |
| 6,121,880 A | 9/2000 | Scott et al. | | |
| 6,127,938 A * | 10/2000 | Friedman | | G07B 15/063 206/720 |
| 6,144,301 A * | 11/2000 | Frieden | | G01V 15/00 283/74 |
| 6,262,692 B1 | 7/2001 | Babb | | |
| 6,308,542 B1 * | 10/2001 | Bolton | | E05B 19/04 70/278.3 |
| 6,421,013 B1 | 7/2002 | Chung | | |
| 6,546,982 B1 * | 4/2003 | Brown | | B60C 23/04 152/152.1 |
| 6,888,509 B2 | 5/2005 | Atherton | | |
| 7,049,962 B2 | 5/2006 | Atherton et al. | | |
| 7,095,324 B2 | 8/2006 | Conwell et al. | | |
| 7,212,118 B1 * | 5/2007 | Wojciechow | | G08B 13/2417 340/572.1 |
| 7,412,898 B1 * | 8/2008 | Smith | | G01L 5/24 73/761 |
| 7,855,649 B2 * | 12/2010 | Masin | | G09F 3/0376 340/572.8 |
| 8,320,601 B2 * | 11/2012 | Takigawa | | H04R 1/1041 381/380 |
| 8,444,058 B2 * | 5/2013 | Masin | | G06K 19/07758 235/492 |
| 8,618,938 B2 * | 12/2013 | Masin | | F17C 13/003 340/572.8 |
| 8,856,033 B2 * | 10/2014 | Hicks | | G06Q 20/20 705/17 |
| 9,373,011 B2 * | 6/2016 | Ahmadloo | | G06K 19/07771 |
| 10,069,250 B2 * | 9/2018 | Niwa | | H01R 13/707 |
| 10,204,297 B2 * | 2/2019 | Lesesky | | G07C 5/008 |
| 10,369,852 B2 * | 8/2019 | Sabatini | | H05K 5/0247 |
| 10,434,828 B2 * | 10/2019 | Wilson | | B60C 23/0493 |
| 2002/0050033 A1 * | 5/2002 | Belden, Jr. | | E05B 73/0017 24/704.1 |
| 2002/0171550 A1 * | 11/2002 | Hirose | | E05B 47/0603 340/572.9 |
| 2002/0174925 A1 * | 11/2002 | Wilson | | B60C 23/04 152/415 |
| 2002/0175096 A1 * | 11/2002 | Linihan | | A44B 15/005 206/305 |
| 2003/0006998 A1 * | 1/2003 | Kumar | | G06F 3/0202 715/700 |
| 2003/0093085 A1 * | 5/2003 | Leopold | | A61M 25/0668 606/108 |
| 2003/0209044 A1 * | 11/2003 | Plate | | B23P 15/005 70/408 |
| 2003/0222150 A1 * | 12/2003 | Sato | | G06K 7/10881 235/472.02 |
| 2004/0134512 A1 * | 7/2004 | Ding | | A61C 15/04 132/323 |
| 2005/0247787 A1 * | 11/2005 | Von Mueller | | G06F 1/1632 235/449 |
| 2005/0263602 A1 * | 12/2005 | Lin | | G06K 19/073 235/492 |
| 2006/0200936 A1 * | 9/2006 | Gardner | | F16L 5/10 16/2.1 |
| 2006/0202824 A1 | 9/2006 | Carroll et al. | | |
| 2006/0220816 A1 * | 10/2006 | Scheungraber | | G06K 19/07764 340/447 |
| 2007/0029384 A1 | 2/2007 | Atherton | | |
| 2007/0146124 A1 * | 6/2007 | Shinmura | | B60C 19/002 340/447 |
| 2007/0182562 A1 * | 8/2007 | Abbott | | B29C 49/0073 340/572.8 |
| 2007/0187517 A1 * | 8/2007 | Parks | | G06K 19/04 235/492 |
| 2007/0247317 A1 | 10/2007 | Farrell | | |
| 2007/0296597 A1 * | 12/2007 | Nizzola | | G06K 19/047 340/572.8 |
| 2008/0016005 A1 | 1/2008 | Owen et al. | | |
| 2008/0042378 A1 * | 2/2008 | Dick | | B65D 19/385 280/29 |
| 2008/0106388 A1 * | 5/2008 | Knight | | A61M 5/31511 340/10.42 |
| 2008/0110774 A1 * | 5/2008 | Chisholm | | G06K 19/07749 206/216 |
| 2008/0131669 A1 * | 6/2008 | Michalk | | B32B 27/12 428/196 |
| 2008/0196535 A1 * | 8/2008 | Dole | | B62D 1/16 74/492 |
| 2008/0238677 A1 * | 10/2008 | Blair | | A61B 90/90 340/572.1 |
| 2009/0045963 A1 | 2/2009 | Vigneron et al. | | |
| 2009/0121877 A1 | 5/2009 | Henderson | | |
| 2009/0128340 A1 * | 5/2009 | Masin | | G06K 19/07798 340/572.9 |
| 2009/0223200 A1 * | 9/2009 | Kinert | | E21B 19/06 59/84 |
| 2009/0224059 A1 * | 9/2009 | Aslanidis | | G06K 19/07749 235/492 |
| 2009/0312053 A1 * | 12/2009 | An | | G06K 7/10326 455/556.2 |
| 2011/0148737 A1 * | 6/2011 | Kang | | H01Q 1/2283 343/904 |
| 2011/0199187 A1 * | 8/2011 | Davidowitz | | B01L 3/508 340/10.1 |
| 2012/0187197 A1 * | 7/2012 | Masin | | G06K 19/07749 235/492 |
| 2013/0199026 A1 * | 8/2013 | Mazoki | | E05B 73/0017 29/601 |
| 2013/0247433 A1 * | 9/2013 | Le Devehat | | G09F 3/12 40/302 |
| 2015/0077257 A1 * | 3/2015 | Pokrajac | | G08B 21/22 340/572.8 |
| 2015/0235120 A1 * | 8/2015 | Warren | | A44C 15/00 235/439 |
| 2016/0048750 A1 * | 2/2016 | Matsumura | | G06K 19/025 235/492 |
| 2019/0257456 A1 * | 8/2019 | Ignaczak | | F16L 37/133 |
| 2020/0129267 A1 | 4/2020 | Lento | | A61C 3/00 |
| 2020/0387767 A1 * | 12/2020 | Masin | | G06K 19/0723 |

* cited by examiner

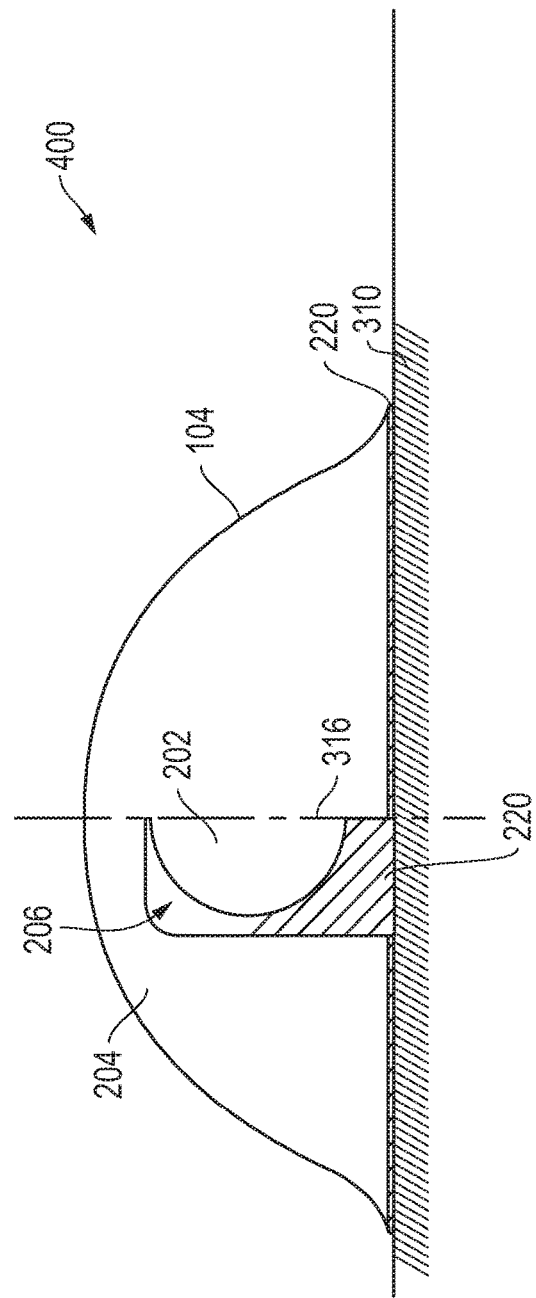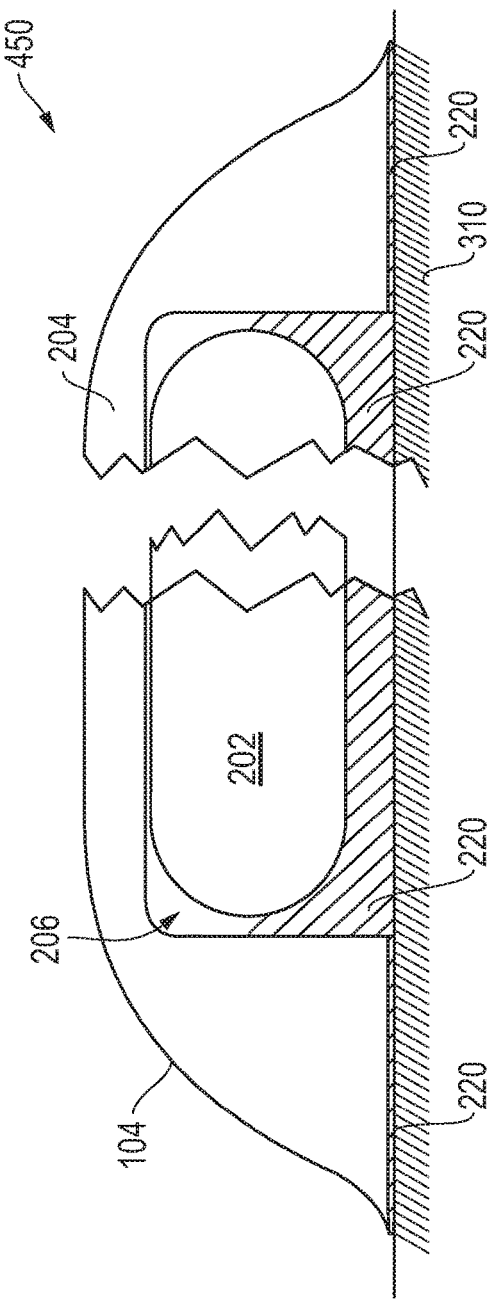

SYSTEMS AND METHODS TO SECURE TRANSPONDERS WITHIN RFID TAGS WITHOUT POTTING ELEMENTS

TECHNICAL FIELD OF THE INVENTION

The present invention relates generally to miniature electronic devices and more particularly to miniature transponder devices suitable for assets management and other purposes.

BACKGROUND

Prior RFID (radio frequency identification) tags exist that are used to help track various products. RFID tags are typically an assembly including an RFID transponder coupled into a protective housing, and the assembly can then be used for assets management, container safety inspection purposes, fraud prevention, ownership identification or other purposes. One application for such RFID tags, for example, is the use of RFID tags to help track hazardous products, such as liquid propane gas (LPG) stored in metal containers or cylinders. However, one problem with existing RFID tags is that they can be removed from the container. Once removed, they can be applied to a different product or re-used. This removal and re-use causes a security risk that is undesirable.

Example embodiments for a tamper resistance RFID tags are described in U.S. Pat. No. 7,855,649 entitled "Tamper Resistant RFID Tags and Associated Methods." For one embodiment described therein, structures protruding from an inner wall of a cavity within a housing that is attached to a surface are used along with an adhesive that bonds more strongly to the surface of the object than to potting elements within the cavity. This embodiment causes an RFID transponder engaged by the potting element within the housing to be rendered inoperable when the housing is pried off the surface. The potting element, however, can add additional expense.

SUMMARY OF THE INVENTION

Systems and methods are disclosed for RFID tags with transponders secured within housings without potting elements using one or more components located at edges of cavities for the housings. For certain disclosed embodiments, an RFID transponder is positioned within a cavity formed in a housing for an RFID tag, and regions at the edge of the cavity are deformed using heat treatment to secure the RFID transponder within the housing. For certain disclosed embodiments, click pins are used to secure the RFID transponder within the housing. Once the RFID transponder is secured within the housing, an adhesive is used to attach the resulting RFID tag to the surface of an object. Preferably, the adhesive fills at least a portion of the cavity surrounding the RFID transponder during this attachment process. Tamper resistant solutions are also disclosed. Other features and variations can be implemented, if desired, and related systems and methods can be utilized as well.

For one embodiment, an assembly is disclosed including an object having a surface and a radio frequency identifier (RFID) tag attached to the surface of the object. The RFID tag includes a housing having a bottom surface and a cavity within the bottom surface, an RFID transponder positioned within the cavity, one or more components located at an edge of the cavity to secure the RFID transponder within the cavity without a potting element, and an adhesive positioned between the bottom surface of the housing and the surface of the object to attach the housing to the surface of the object.

In additional embodiments, the one or more components include one or more heat-treated regions at the edge of the cavity, and the heat-treated regions are deformed to secure the RFID transponder within the cavity. In further embodiments, the adhesive fills at least a portion of the cavity surrounding the RFID transponder. In still further embodiments, the housing includes at least one of a plastic material or a ceramic material.

In additional embodiments, the one or more components include a plurality of click pins to secure the RFID transponder within the cavity. In further embodiments, the assembly includes spaces between the click pins and inside edges of the housing, and the click pins are resilient so that they move into the spaces during insertion of the RFID transponder into the cavity. In still further embodiments, the adhesive fills at least a portion of the cavity surrounding the RFID transponder. In still further embodiments, the click pins are a plastic material.

For one embodiment, an RFID tag is disclosed including a housing having a bottom surface and a cavity within the bottom surface, an RFID transponder positioned within the cavity, and one or more components located at an edge of the cavity to secure the RFID transponder within the cavity without a potting element.

In additional embodiments, the one or more components include a plurality of heat-treated regions at the edge of the cavity, and the heat-treated regions are deformed to secure the RFID transponder within the cavity. In further embodiments, the heat-treated regions include four or more heat-treated regions. In still further embodiments, the heat-treated regions are circular regions formed with a heating rod applied against the edge of the cavity.

In additional embodiments, the one or more components include a plurality of more click pins to secure the RFID transponder within the cavity. In further embodiments, the RFID tag includes spaces between the click pins and inside edges of the housing, and the click pins are resilient so that they move into the spaces during insertion of the RFID transponder into the cavity.

In additional embodiments, the RFID transponder includes at least one of an encapsulated RFID transponder or a non-encapsulated RFID transponder.

For one embodiment, a method is disclosed including providing a housing having a bottom surface and a cavity within the bottom surface, positioning an RFID transponder within the cavity, and securing the RFID transponder within the cavity without a potting element using one or more components located at an edge of the cavity, where the housing and the secured RFID transponder provide an RFID tag.

In additional embodiments, the securing includes securing the RFID transponder within the cavity by deforming a plurality of regions at the edge of the cavity with heat treatment to create the one or more components. In further embodiments, the securing includes deforming four or more regions with the heat treatment. In still further embodiments, the securing includes pressing a heating rod against the edge of the cavity to deform circular regions as the heat-treated regions.

In additional embodiments, the securing includes inserting the RFID transponder into the cavity past a plurality of click pins, and the click pins provide the one or more components to secure the RFID transponder within the cavity. In further embodiments, the click pins are resilient and move into spaces between the click pins and inside edges of the housing during the inserting.

In additional embodiments, the method includes attaching the RFID tag to a surface by applying an adhesive to the bottom surface of the housing such that at least a portion of the cavity around the RFID transponder is filled with the adhesive.

Different and/or additional features, variations, and embodiments can also be implemented, as desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIGS. 4A-4B are end and side views of the RFID tag installed on a surface of an object.

DETAILED DESCRIPTION OF THE INVENTION

Systems and methods are disclosed for RFID tags with transponders secured without potting elements. For certain disclosed embodiments, the edge of a cavity within a housing for an RFID tag is deformed using the heat treatment to form one or more heat-treated regions that secure a RFID transponder within the housing. For certain disclosed embodiments, click pins are used to secure the RFID transponder within the housing. The RFID tag is then attached to the surface of an object. Various embodiments can be implemented while taking advantage of the techniques described herein.

The embodiments described herein use one or more components at an edge of a housing for a transponder to secure the transponder within the housing without the use of a potting element. A potting element is an epoxy typically used to secure an RFID transponder within a housing, for example, as described in U.S. Pat. No. 7,855,649. For example, the potting element is often implemented as a two-part unfilled electronic grade epoxy encapsulant, such as EP 1121 (black) available from Ellsworth Adhesives. The embodiments disclosed herein do not use such a potting element to secure RFID transponders within the housings and thereby reduce costs and simplify installation of the resulting RFID tags.

Figure 1B:
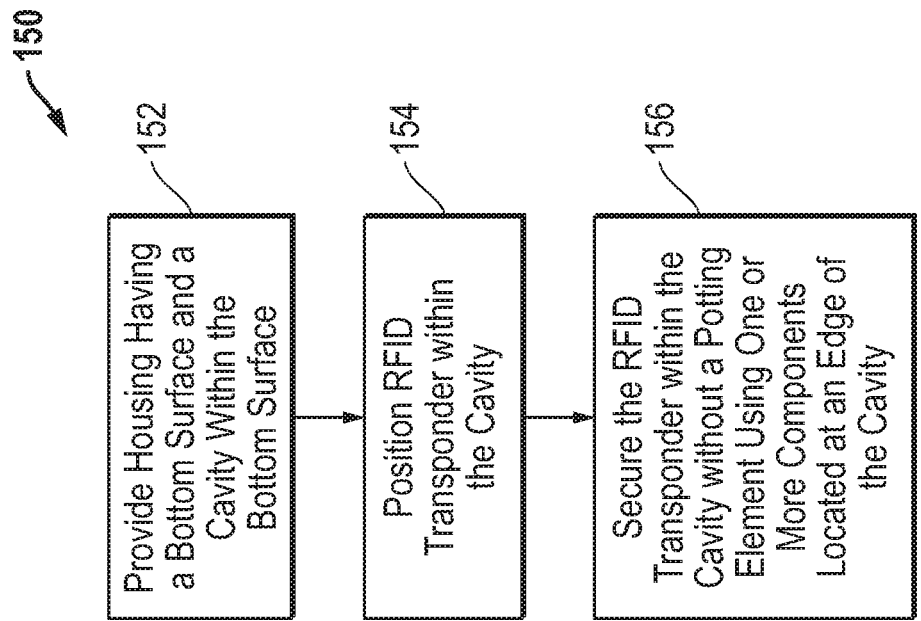
FIG. 1B is a process flow diagram of an example embodiment where an RFID transponder is secured within a housing without potting elements using one or more components located at an edge of a cavity for the housing.
Figure 1A:
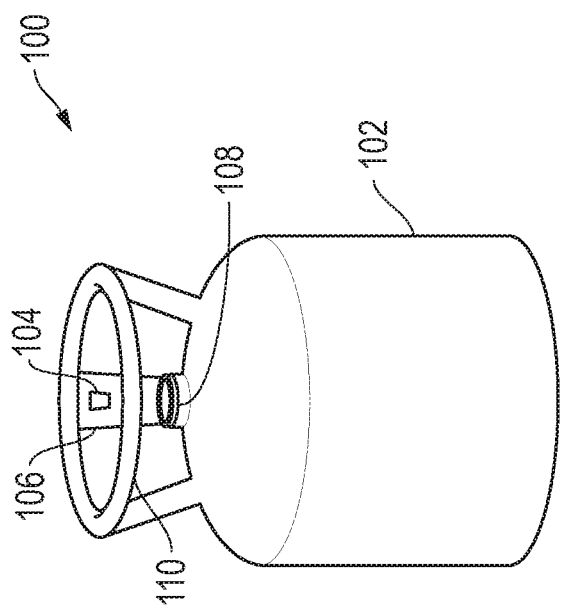
FIG. 1A is a diagram of an RFID tag secured to a material container, such as a metal cylinder holding liquid propane gas (LPG).

FIG. 1A is a diagram for an embodiment 100 for an RFID tag 104 coupled to an object 102 such as a metal cylinder holding LPG or other hazardous or non-hazardous material. The cap 108 for the metal cylinder depicted is located at the top of the cylinder. The RFID tag 104 may be positioned on a metal surface of the metal cylinder. As depicted for this embodiment, the RFID tag 104 is positioned on an inside surface of a metal stay plate 106 connecting the gas containing portion of the cylinder to a ring 110 that can be used for picking up or moving the cylinder. Other locations for the RFID tag 104 could also be used, as desired. It is further noted that the object 102 could be any desired container or other object to which it is desired to attach the RFID tag 104. It is also noted that the surface on the object to which the RFID tag 104 is attached can be any desired material, including a metal surface or other material surface.

FIG. 1B is a process flow diagram of an example embodiment 150 where an RFID transponder is secured within a housing without potting elements using one or more components located at an edge of a cavity for the housing. In block 152, a housing is provided for the RFID tag, and the housing includes a bottom surface and a cavity within the bottom surface. In block 154, an RFID transponder is positioned within the cavity. In block 156, the RFID transponder is secured within the cavity without a potting element using one or more components located at an edge of the cavity. It is noted that the one or more components can be implemented using a variety of techniques. For example, heated treated regions provide these components in FIGS. 2A-C and FIGS. 3A-F. As a further example, click pins provide these components in FIGS. 5A-B. FIGS. 4A-4B provide an example embodiment for an RFID tag installed on the surface of an object.

Figure 2A:
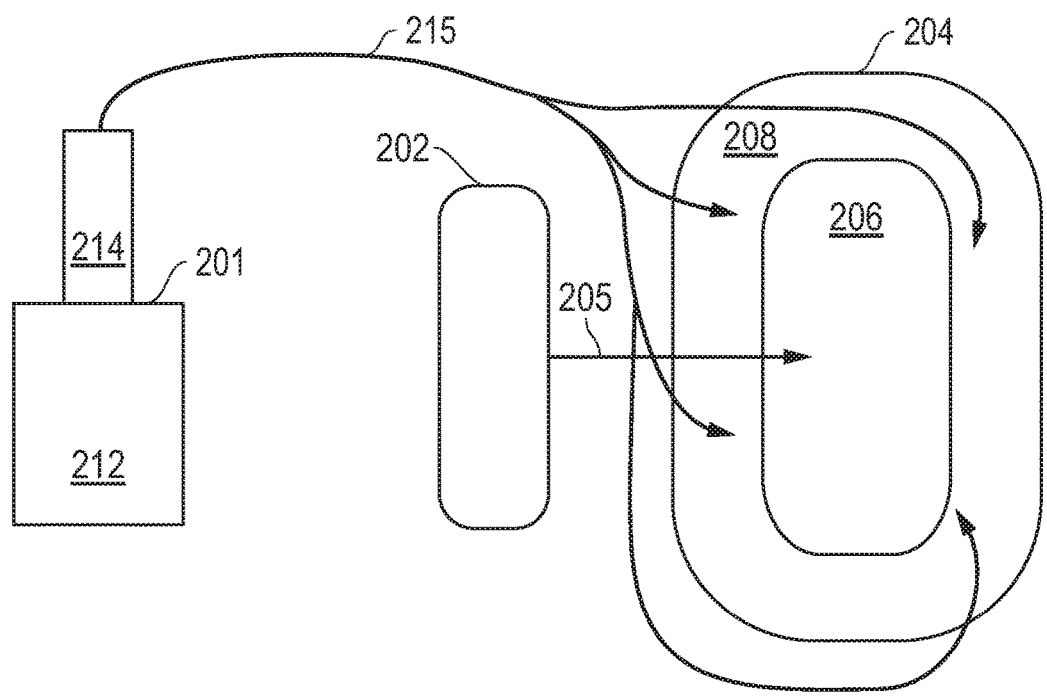
FIG. 2A is a diagram for a housing, an RFID transponder, and a heating element that is used to deform the edge of a cavity within the housing to secure the RFID transponder.

Looking now to FIG. 2A, a diagram is provided of an example embodiment for assembly of an RFID tag 104 using heat treatment. RFID transponder 202 and a housing 204 for the transponder 202 are shown along with a heating element 201 that is used to secure the transponder 202 within the housing 204. The bottom surface 208 of the housing 204 includes a cavity 206 in which the transponder 202 can be positioned as represented by arrow 205. As described herein, the transponder 202 is secured within the cavity 206 by deforming one or more regions at the edge of the cavity with heat treatment as represented by arrows 215. The RFID transponder 202 can be an encapsulated RFID transponder or a non-encapsulated RFID transponder. Further, as described herein, an adhesive can also be used to attach the RFID tag 104 to the object 102 as shown in FIG. 1A.

The heating element 201 can be a wide variety of heating devices or systems that can heat a localized area of the housing 204 such as the edge of the cavity 206. For example, the heating element 201 can include a heating rod 214 and a heat generator 212. For one embodiment, the heat generator 212 heats the heating rod 214 using resistive heating. Other heating techniques and structures can also be used.

Figure 2B:
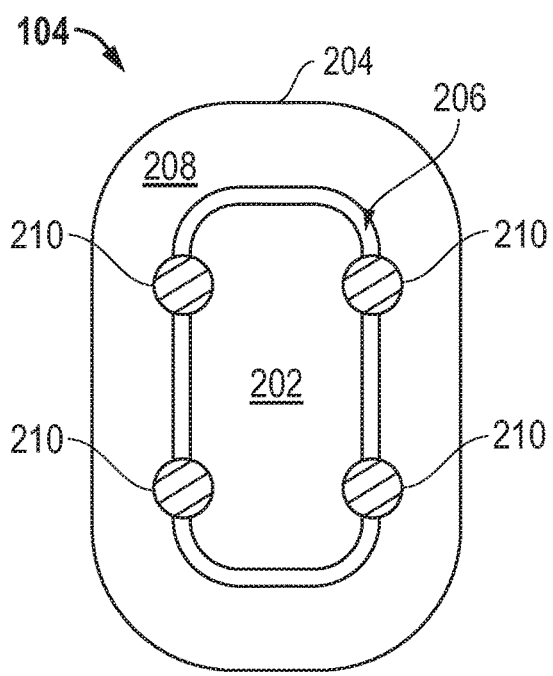
FIG. 2B is a diagram of the resulting RFID tag after one or more heat-treated regions have been formed at the edge of the cavity using the heating element.

FIG. 2B is a diagram of the resulting RFID tag 104 after one or more heat-treated regions 210 have been deformed at the edge of the cavity 206 using the heating element 201. These heat-treated regions 210 on the bottom surface 208 for the housing effectively secure the RFID transponder 202 within the cavity 206 for the housing 204. The heat-treated regions 210 can be circular regions, for example, where a circular heat and/or pressure is applied by the heating element 201. However, it is noted that the heat-treated regions 210 can take on other shapes depending upon the heating element 201 being used.

Figure 2C:
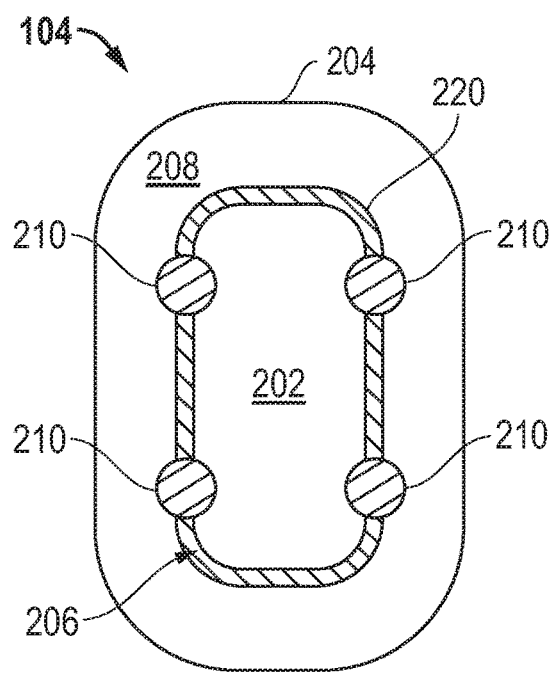
FIG. 2C is a diagram of the RFID tag 104 after an adhesive has been added to attach the RFID tag to the surface of an object.

FIG. 2C is a diagram of the RFID tag 104 after an adhesive 220 has been applied to attach the RFID tag 104 to the surface of an object 102 as shown in FIG. 1A. The adhesive 220 preferably fills at least a portion of the cavity 206 around the RFID transponder 202. Although not shown, it is noted that the adhesive 220 will also cover a portion of the bottom surface 208 for the housing 204 to secure the RFID tag 104 to the object 102.

FIGS. 3A-3F are cross-section diagrams showing the application of a heating rod 214 to deform the edges of the cavity 206 and thereby to form heat-treated regions 210 that secure the transponder 202 within the housing 204. While these embodiments show the use of a heating element 201 with a heating rod 214, it is noted that other heating devices and systems could also be used. Further, while four heat-treated regions 210 are shown, different numbers of heat-treated regions 210 could also be used to secure the transponder 202 within the housing 204.

Figure 3A:
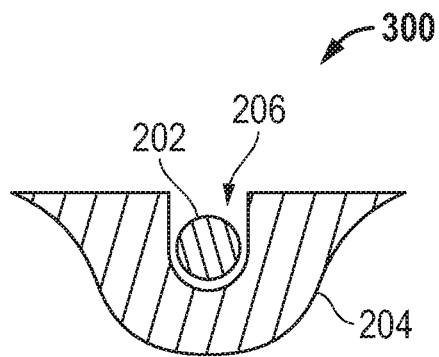
FIGS. 3A-3F are cross-section diagrams showing the application of a heating element to deform the edges of the cavity and thereby to form heat-treated regions that secure the transponder within the housing.

Looking now to FIG. 3A, an embodiment 300 is provided where a transponder 202 has been positioned within the cavity 206 for a housing 204.

Figure 3B:
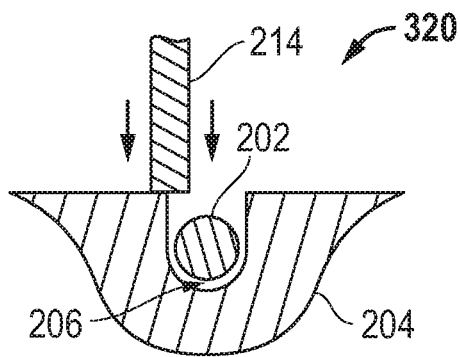

FIG. 3B provides an embodiment 320 where the heating rod 214 is applied to the edge of the cavity 206 to deform a region and thereby form a heat-treated region to secure the transponder 202 within the housing 204. It is further noted that pressure can be applied at the same time that heat is applied through the heating rod 214. This pressure and heat facilitates the deformation of the edge of the cavity 206 to form the heat-treated region.

Figure 3C:
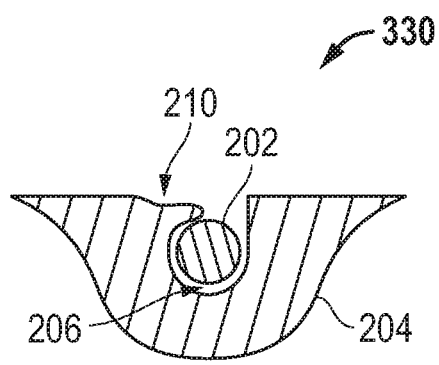

FIG. 3C provides an embodiment 330 showing the heat-treated region 210 that results from the application of heating rod 214 in FIG. 3B. This heat-treated region 210 helps to secure the transponder 202 within the housing 204.

Figure 3D:
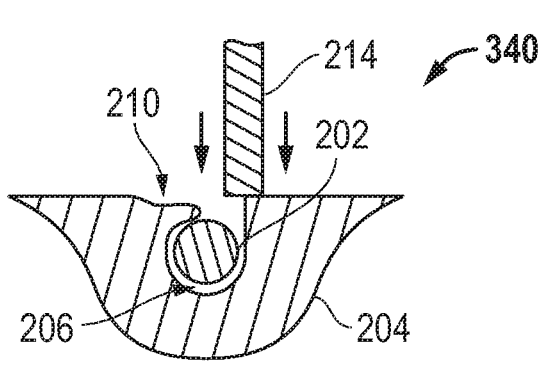

FIG. 3D provides an embodiment 340 where the heating rod 214 is applied to the edge of the cavity 206 to deform a second region and thereby form a second heat-treated region 210 to secure the transponder 202 within the housing 204. As indicated above, pressure can also be applied along with the heat from the heating rod 214 to facilitate deformation of the edge of the cavity 206.

Figure 3E:
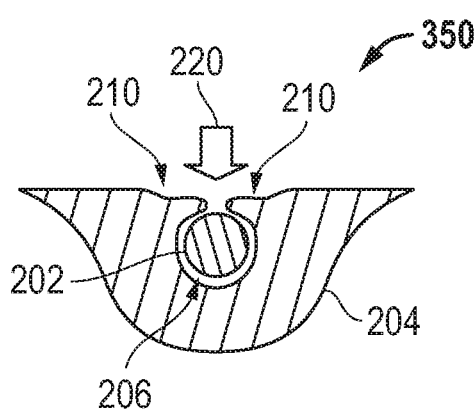

FIG. 3E provides an embodiment 350 showing the second heat-treated region 210 that results from the application of heating rod 214 in FIG. 3D. This second heat-treated region 210 also helps to secure the transponder 202 within the housing 204. As described herein, one or more heat-treated regions 210 can be formed to secure the transponder 202 within the housing 204. After all of the heat-treated regions 210 have been formed, an adhesive 220 can be applied, for example, to attach the housing 204 with the secured transponder 202 to the surface of an object.

Figure 3F:
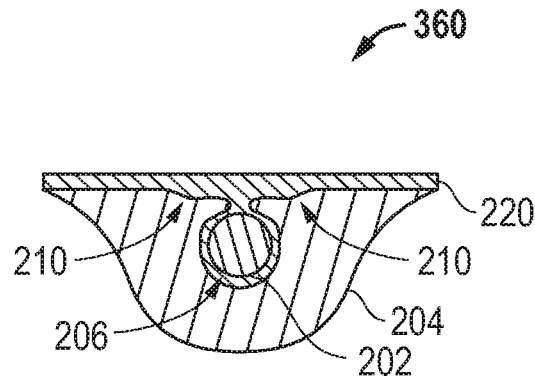

FIG. 3F provides an embodiment 360 after the adhesive 220 has been applied to the housing 204. As shown, the adhesive 220 preferably fills at least a portion of the cavity 206 surrounding the transponder 202.

FIG. 4A is an end view 400 of the RFID tag 104 installed on a surface 310 of an object such as a metal cylinder. As depicted, the left side of the plastic housing 204 is cut away along line 316 to reveal the end of the transponder 202, the cavity 206, and the adhesive 220. The adhesive 220 fills a portion of the cavity 206 surrounding the transponder 202. Adhesive 220 also attaches the housing 204 to the surface 310. Although not shown, the transponder 202 is secured into the housing 204 using the heat-treated regions 210 as described above.

FIG. 4B is a side view 450 of the RFID tag 104 installed on the surface 310 of the object shown in FIG. 4A. The adhesive 220 is again shown as filling a portion of the cavity 206 surrounding the transponder 202. The adhesive 220 also attaches the housing 204 to the surface 310. Although not shown, the transponder 202 is secured into the housing 204 using the heat-treated regions 210 as described above.

It is noted that the surface 310 of an object can be a wide variety of materials. Where the surface 310 is metal, it can be made from a common metal used for containers, such as stainless steel, or other metal materials. It is also noted that the surface 310 can be located on any object for which it is desired to attach the RFID tag 104.

It is also noted that the plastic housing 204 may be made from ABS plastic. ABS (Acrylonitrile Butadiene Styrene) plastic is a terpolymer of acrylonitrile, butadiene and styrene. Usual compositions are about half styrene with the balance divided between butadiene and acrylonitrile. Considerable variation is, of course, possible resulting in many different grades of ABS with a wide range of features and applications. In addition, many blends with other materials such as polyvinylchloride, polycarbonates and polysulfones have been developed. Acrylonitrile butadiene styrene materials can be processed by any of the standard thermoplastic processing methods.

Figure 5A:
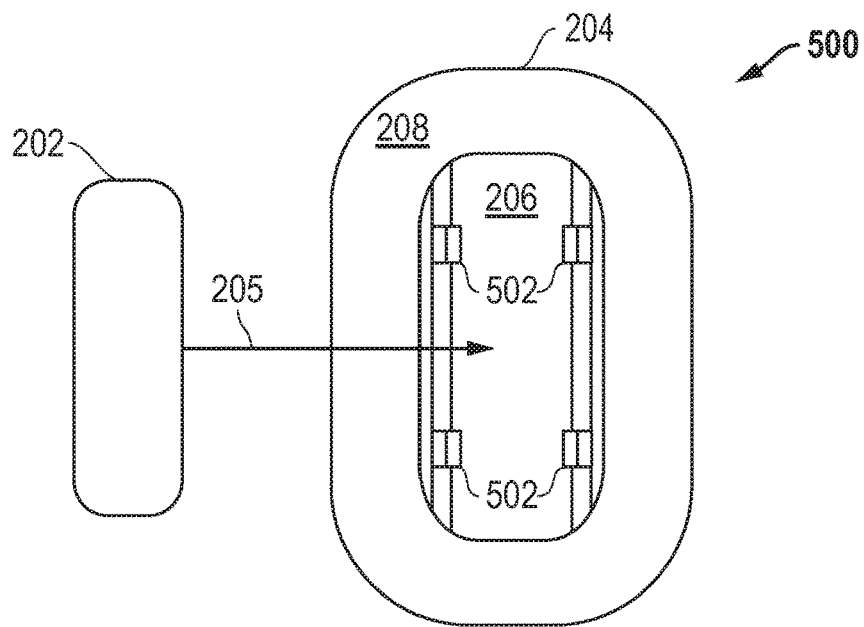
FIGS. 5A-5B provide example embodiments where click pins are used to secure the RFID transponder within a housing.
Figure 5B:
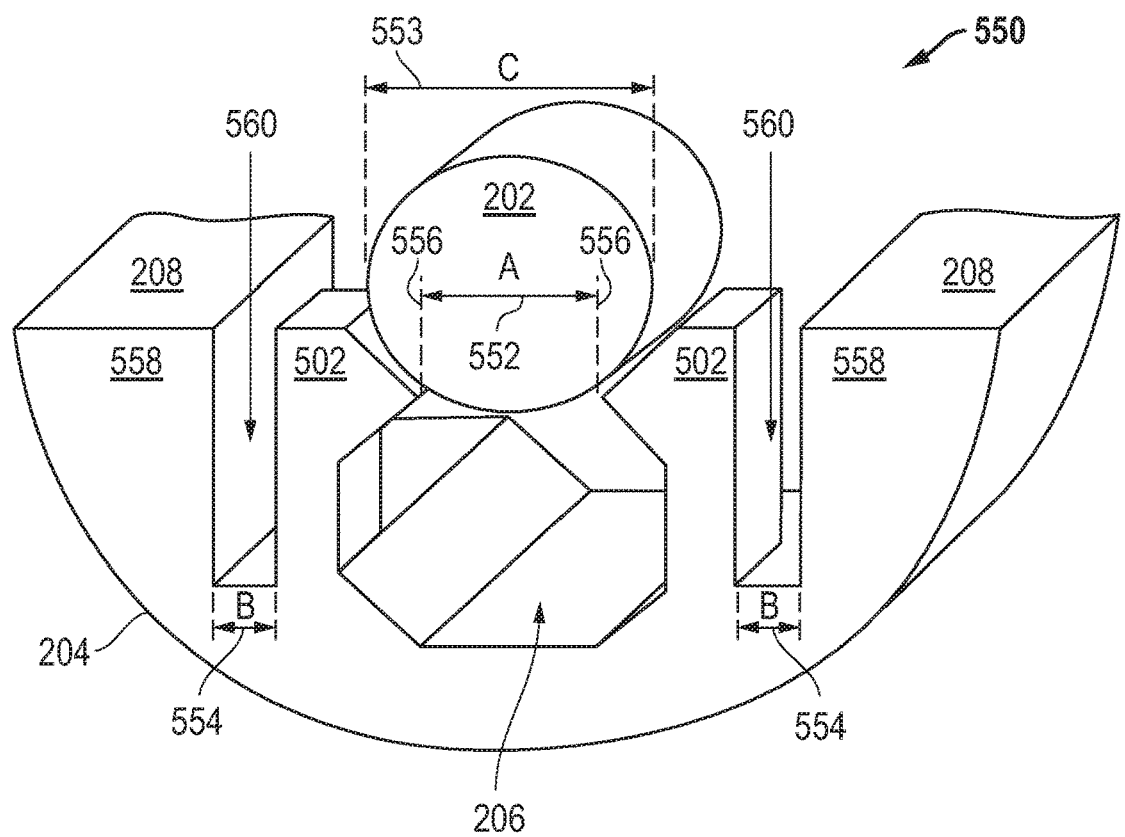

Looking now to FIGS. 5A-5B, an example embodiment is provided where an RFID transponder 202 is secured within a housing 204 without a potting element through the use of click pins 502. As described herein, the click pins 502 are preferably resilient and configured to move into spaces 560 formed between the click pins 502 and the inside edges of the outer portions 558 for the housing 204.

FIG. 5A is a diagram of a bottom view for an example embodiment 500 where the RFID transponder 202 is inserted within a cavity 206 within a housing 204 as indicated by arrow 205. The RFID transponder 202 is secured within the cavity 206 with the help of click pins 502. For the example embodiment depicted, four click pins 502 are used and are configured as two pairs of opposing click pins 502. It is noted that different numbers and configurations for the click pins 502 can also be used. As indicated above, the RFID transponder 202 can be an encapsulated RFID transponder or a non-encapsulated RFID transponder. Further, as described herein, an adhesive can also be used to attach the housing 204 for the RFID tag 104 to a surface as shown in FIG. 1A and further described with respect to FIGS. 4A-4B.

FIG. 5B provides an example embodiment 550 for a partial perspective view associated with two of the click pins 502 for the embodiment of FIG. 5A. The transponder 202 is positioned so that it is inserted past the internal edges 556 for the click pins 502 into the cavity 206. During insertion, the click pins 502 are displaced away from the cavity 206 and move into the spaces 560 between the click pins 502 and the outside portion 558 of the housing 204.

It is noted that the transponder 202 will overlap the click pins 502 by some distance. For the embodiment 550, it is assumed that the transponder 202 is cylindrical, and the diameter of the transponder 202 is a distance 553 represented by the distance C. The portion of the transponder 202 that does not overlap the click pins 502 is assumed to be a distance 552 represented by distance A. As the transponder 202 is inserted past the click pins 502, the click pins 502 will be displaced by a total distance of $C$ minus $A$. Thus, it is expected that each click pin 502 will be displaced by a distance of $(C-A)/2$. For one embodiment, the spaces 560 formed between the click pins 502 and the outside portion 558 for the housing 204 can be configured to be equal to this expected displacement distance. Thus, where the distance 554 represents the size of the spaces 560 and is represented by the distance B, then the distance B can be set to the expected displacement distance for each click pin so that B=(C−A)/2. Other variations and configurations could also be used.

The click pins 502 are preferably resilient so that they can be deformed towards spaces 560 as the transponder 202 is inserted into the cavity 206. Being resilient, the click pins 502 will then move back into their original position after the transponder 202 has been inserted. After the transponder 202 has been inserted and is secured by the click pins 502, an adhesive can be applied as described above to attach the housing 204 with the secured transponder 202 to the surface of an object. Further, as shown with respect to FIGS. 4A-4B, the adhesive 220 preferably fills at least a portion of the cavity 206 surrounding the transponder 202.

It is noted that the housing 204 and the click pins 502 can be made as a single molded piece, for example, from a plastic material. However, the click pins 502 can also be formed as separate pieces that are inserted or otherwise secured within the housing 204 prior to insertion of the transponder 202. For example, the click pins 502 could be formed as part of a separate plastic piece that is inserted and glued into a ceramic housing 204. It is further noted that various molding techniques, including injection molding, can be used. Other variations and manufacturing techniques could also be implemented.

For the example embodiment of FIGS. 5A-5B, the click pins 502 are shown to be formed as vertical posts extending from the bottom of the cavity 206 towards the bottom surface 208 for the housing 204. Further, each of the click pins 502 includes a ridge formed on the end closest to this bottom surface 208 for the housing 204. These ridges are configured to have slanted faces that engage the transponder 202 as it is inserted into the cavity 206. Further, the slanted faces for the click pins 502 help to urge the transponder 202 into cavity 206 during insertion. Once inserted, opposing slanted faces on the ridges help to secure the transponder 202 within the cavity 206. The amount by which the transponder 202 and the click pins 502 overlap can be adjusted by adjusting the size of the ridges within the ends of the click pins 502. For example, adjustments can be made to the relative sizes based upon the materials and configurations being used. As such, a wide variety of configurations could be used for the click pins 502 while still taking advantage of the click pin technique described herein to secure the transponder 202 within the cavity 206 without the use of a potting element.

It is noted that the example embodiments of FIGS. 5A-5B are provided as only one example embodiment, and other configurations for the click pins 502, the spaces 560, and the size/shape of the transponder 202 can also be implemented while still taking advantage of the click pin related techniques described herein.

Example Tamper Proof Embodiments

For certain embodiments, it is desirable to have the RFID tag 104 be destroyed and/or rendered inoperative when it is removed, and/or an attempt is made to remove it, from the object 102 to which it is attached. One such application in which this result is desired is for an application where RFID tags are used to track hazardous materials, such as LPG stored in metal cylinders or other containers. U.S. Pat. No. 7,855,649 describes embodiments for tamper resistor RFID tags, and the embodiments described herein can be used in combination with embodiments described in U.S. Pat. No. 7,855,649. U.S. Pat. No. 7,855,649 is hereby incorporated by reference in its entirety.

For one tamper resistant embodiment, the object 102 has a metal surface 310, and the housing 204 for the RFID tag 104 is made from plastic or ceramic material. An adhesive 220 with differing connection strengths with respect to metal as opposed to plastic or ceramics is used to facilitate destruction of the RFID tag 104 should an attempt be made to remove it from the object. This difference in connection strength makes it extremely difficult if not impossible for the RFID tag to be removed without destroying it and/or rendering inoperative the RFID transponder 202 secured within the housing 204.

As described herein, the RFID transponder 202, either in encapsulated form or in non-encapsulated form, is enclosed within a plastic housing 204. The encapsulate form, for example, can be encapsulation within glass. For one embodiment, an ABS plastic material can be used for the plastic housing 204. As described above, the transponder 202 is positioned within the cavity 206 and secured with one or more heat-treated regions 210. The completed assembly for the RFID tag 104 is then attached to the surface 310 of the container by adhesive 220. The adhesive 220 is selected to have desirable adhesive properties. Once constructed and attached, the RFID tag 104 and the properties of materials used herein work together in sequence to achieve an attached RFID tag 104 that is difficult or impossible to remove without destroying the RFID tag and/or rendering it inoperable.

Transponder—The transponder 202 can have an antenna made of copper wire (e.g., 5-15 microns thickness) that is wound around a ferrite core and connected to an RFID integrated circuit. This connection can be made directly to the gold bumps on an RFID integrated circuit, through a compression bonding process, or via a substrate that may include additional components such as storage and/or tuning capacitors. The transponder 202 can be encapsulated in glass for additional protection against outside elements over long time periods. Alternatively, the transponder 202 can be used without protective glass encapsulation.

Housing—The housing 204 can be made of non-magnetic materials permitting operation of low-frequency RFID devices (e.g., 100-400 kHz), such as plastics, ceramics and glass. Plastic materials, such as plastic and ABS plastic, permit some flexibility. Ceramics and glass materials may also be utilized, but are more brittle. A space or cavity 206 is formed within the housing 204, and this space or cavity 206 is configured to receive the transponder 202. If desired, the housing 204 can also have two or more wedges protruding from the walls into the transponder space or cavity 206, if desired. These wedges can help position the transponder 202 and can help destroy it and/or help render it inoperable when the RFID tag 104 is removed. In addition, to make the housing 204 more difficult to pry off, the housing 204 for the RFID tag 104 can be shaped with rounded edges and a low profile (e.g., only about 4-4.5 mm high).

Adhesive—Adhesive 220 can be an adhesive that bonds more strongly to the material used for the object 102 (e.g., metal material or other material) than it does to the material used for the housing 204 (e.g., plastic or ceramic material). When using metal for the object 102 and plastic for the housing 204, such as ABS plastic, adhesives such as 3M products Scotch-Weld DP810, DP125 and/or DP420 or similar adhesives can be utilized for the adhesive 220. Preferably, a strength of adhesion for the adhesive 220 to the surface 310 of the object is 100 pounds per square inch or more greater than a strength of adhesion for the adhesive to the to the housing.

ABS Housing for Improved Tamper Resistance—For an ABS plastic solution for the housing 204 and a metal container for object 102, one tamper resistant solution uses an adhesive 220 to attach the RFID tag 104 to surface 310 that will adhere more (and preferably significantly more) to the metal than to the ABS plastic. One example of such an adhesive is DP420 from 3M Company that has a sheer strength of about 1900 PSI (pounds per square inch) with metal but a peel strength of about 900 PSI to ABS plastic.

Removal Attempts and Sizing—When someone attempts to pry the RFID tag 104 off the surface 310, the RFID tag 104 will either be crushed and/or, if lifted, partially bent, thereby destroying the electronic transponder 202. Where glass encapsulation is used for the transponder 202, this glass encapsulation will tend to be crushed or destroyed during removal attempts. Should the RFID tag 104 be completely pulled off the surface 310, the adhesive will stick to the surface 310 better than to the housing 204, and the RFID tag 104 will tend to be destroyed. Further, a low profile (e.g., only about 4-4.5 mm high) and rounded surfaces for the housing 204 can also be used that do not allow easy application of side forces applied in most removal attempts.

Ceramic Housing—For a ceramic solution for the housing 204, tamper proof operation is facilitated by using an adhesive 220 with a high degree of the adhesion to the ceramic material as well as to the surface 310 of the object. In this case, any attempt to remove the RFID tag 104 will result in shattering of the ceramic housing 204 and resulting irreversible damage to the transponder 202.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. An assembly, comprising:
   an object having a surface;
   a radio frequency identifier (RFID) tag attached to the surface of the object, the RFID tag comprising:
     a housing having a bottom surface and a cavity within the bottom surface;
     an RFID transponder positioned within the cavity;
     a plurality of click pins located at an edge of the cavity and deformable to secure the RFID transponder within the cavity; and
     spaces adjacent the plurality of click pins, the spaces located between the click pins and inside edges of the housing, wherein the plurality of click pins are resilient so that they move from an original position into the spaces during insertion of the RFID transponder into the cavity and thereafter to the original position; and
   an adhesive positioned between the bottom surface of the housing and the surface of the object to attach the housing to the surface of the object, wherein the adhesive fills at least a portion of the cavity surrounding the RFID transponder.

2. The assembly of claim 1, wherein the click pins comprise a plastic material formed as posts extending from a bottom of the cavity towards the bottom surface of the housing.

3. The assembly of claim 2, wherein the click pins include a first slanted face to engage the RFID transponder during insertion into the cavity and a second slanted face to secure the RFID transponder within the cavity.

4. The assembly of claim 1, wherein each of the spaces has a length set to an expected displacement distance for a corresponding click pin.

5. The assembly of claim 1, wherein the housing and the plurality of click pins are formed as a single piece.

6. A radio frequency identifier (RFID) tag, comprising:
   a housing having a bottom surface and a cavity within the bottom surface;
   an RFID transponder positioned within the cavity;
   a first plurality of click pins located at a first edge of the cavity, the first plurality of click pins deformable to secure the RFID transponder within the cavity;
   a second plurality of click pins located at a second edge of the cavity opposite the first edge of the cavity, the second plurality of click pins deformable to secure the RFID transponder within the cavity;
   spaces adjacent the first and second plurality of click pins and further located between the first and second plurality of click pins and inside edges of the cavity, wherein the first and second plurality of click pins are resilient so that they move from an original position into the spaces during insertion of the RFID transponder into the cavity and thereafter to the original position; and wherein the RFID tag is configured to attach to a surface of an object with an adhesive positioned between the bottom surface of the housing and the surface of the object, such that the adhesive fills at least a portion of the cavity surrounding the RFID transponder.

7. The RFID tag of claim 6, wherein the RFID transponder comprises at least one of an encapsulated RFID transponder or a non-encapsulated RFID transponder.

8. The RFID tag of claim 6, wherein the plurality of click pins include a first slanted face to engage the RFID transponder during insertion into the cavity and a second slanted face to secure the RFID transponder within the cavity.

9. The RFID tag of claim 6, wherein each of the spaces has a length set to an expected displacement distance for a corresponding click pin.

10. A method, comprising:
    providing a housing having a bottom surface and a cavity within the bottom surface;
    positioning an RFID transponder within the cavity;
    securing the RFID transponder within the cavity without a potting element using one or more components located at an edge of the cavity, wherein the securing comprises inserting the RFID transponder into the cavity past a plurality of click pins that are deformable, the click pins providing the one or more components to secure the RFID transponder within the cavity;
    wherein the housing and the secured RFID transponder provide an RFID tag; and
    attaching the RFID tag to a surface by applying an adhesive to the bottom surface of the housing such that at least a portion of the cavity around the RFID transponder is filled with the adhesive.

* * * * *